United States Patent
Gaumont (10) Patent No.: US 10,501,382 B2
(45) Date of Patent: Dec. 10, 2019

(54) DYNAMIC DISINTEGRATION ENRICHING AGENTS AND FERTILISERS, THEIR METHOD OF MANUFACTURE, AND THEIR USES IN AGRICULTURE

(75) Inventor: François-Xavier Gaumont, Chartres (FR)

(73) Assignee: Omya International AG, Blue Ash, OH (US)

(*) Notice: Subject to any disclaimer, the term of this patent is extended or adjusted under 35 U.S.C. 154(b) by 0 days.

(21) Appl. No.: 13/992,792

(22) PCT Filed: Dec. 7, 2011

(86) PCT No.: PCT/IB2011/002976
§ 371 (c)(1),
(2), (4) Date: Aug. 1, 2013

(87) PCT Pub. No.: WO2012/076971
PCT Pub. Date: Jun. 14, 2012

(65) Prior Publication Data
US 2014/0000329 A1    Jan. 2, 2014

(30) Foreign Application Priority Data
Dec. 10, 2010  (EP) .................................. 10015510

(51) Int. Cl.
*C05G 3/00*     (2006.01)
*C05D 3/02*     (2006.01)

(52) U.S. Cl.
CPC ................ *C05G 3/00* (2013.01); *C05D 3/02* (2013.01); *C05G 3/0058* (2013.01); *Y02P 20/136* (2015.11)

(58) Field of Classification Search
CPC .......... C05G 3/00; C05G 3/0058; C05D 3/02; Y02P 20/136
(Continued)

(56) References Cited

U.S. PATENT DOCUMENTS 2,912,318 A * 11/1959 Kieweg .................... C05C 1/00
                                                        71/47
4,015,973 A    4/1977 Perrine
(Continued)

FOREIGN PATENT DOCUMENTS

CA    1019355 A1    10/1977
CN    101595870 A   12/2009
(Continued)

OTHER PUBLICATIONS

"Super Water Gel Crystals". The Gardeners Friend. pp. 1-4 (2007).*
(Continued)

*Primary Examiner* — Jennifer A Smith
(74) *Attorney, Agent, or Firm* — Schwegman Lundberg & Woessner, P.A.

(57) ABSTRACT

The invention relates to a particularly basic inorganic soil conditioner containing an inorganic carbonate as the base thereof, characterised in that it comprises at least one "dynamic disintegration" agent capable of causing a breakdown, considerable fragmentation, dispersion, and considerable "dispersion" within the granule, i.e. a force inside and/or on the surface of the granule that tends to cause the granule to break down or "explode" when said granule contacts the soil, and specifically contacts the water or moisture of the soil, and in that said carbonate is preferably natural or precipitated calcium carbonate.

13 Claims, 8 Drawing Sheets

(58) Field of Classification Search
USPC .................................................... 71/27–34
See application file for complete search history.

(56) References Cited

U.S. PATENT DOCUMENTS

| | | | |
|---|---|---|---|
| 5,078,779 A * | 1/1992 | Van de Walle et al. | 71/63 |
| 5,383,952 A * | 1/1995 | Singewald et al. | 71/63 |
| 5,720,793 A * | 2/1998 | Kato et al. | 71/16 |
| 6,413,291 B1 * | 7/2002 | Wommack | C05D 3/00 23/313 P |
| 2006/0178271 A1 * | 8/2006 | Lynch | A01N 25/12 504/363 |
| 2014/0000329 A1 * | 1/2014 | Gaumont | 71/27 |

FOREIGN PATENT DOCUMENTS

| | | | |
|---|---|---|---|
| FR | 2218932 A1 | 9/1974 | |
| GB | 2209744 A | 5/1989 | |

OTHER PUBLICATIONS

Mahler, Robert L., and Robert E. McDole. "Fertilizer primer: terminology, calculations and application." Current information series—Cooperative Extension Service, University of Idaho (USA) (1990).*

The International Search Report (in French) dated Mar. 12, 2012, for PCT Application No. PCT/IB2011/002976.

The Written Opinion of the International Searching Authority (in French) dated Mar. 12, 2012, for PCT Application No. PCT/IB2011/002976.

* cited by examiner

DYNAMIC DISINTEGRATION ENRICHING AGENTS AND FERTILISERS, THEIR METHOD OF MANUFACTURE, AND THEIR USES IN AGRICULTURE

CROSS-REFERENCE TO RELATED APPLICATIONS

This application is a U.S. national phase of PCT Application No. PCT/IB2011/002976, filed Dec. 7, 2011, which claims priority to European Application No. 10015510.0, filed Dec. 10, 2010.

TECHNICAL SECTOR

The present invention relates to the technical sector of fertilising materials, more specifically enriching agents and fertilisers of use in all fields of agriculture in general, such as cereal and fodder agriculture, large crops, oil crops, protein crops, and including all related fields, such as forestry, forest crops in general, nurseries, production of vegetables and leguminous plants, and all other types of agriculture, including meadows, biomass crops intended for energy generation, plant cover crops for environmental purposes and domestic or leisure uses on turf or planted terrain, hereinafter throughout the description and the claims: "enriching agents".

More specifically, the present invention relates, but on a non-restrictive basis, to enriching agents and fertilisers containing minerals, most specifically calcium carbonates of all types and all origins (natural, or industrial such as, for example, PCC or precipitated calcium carbonate), and more specifically enriching agents known as "basic mineral" enriching agents.

Lastly, the invention relates specifically to the preparation of such enriching agents or fertilisers in the form of granules with great ground "colonisation" power, i.e. great power of coverage of the ground surface.

PRIOR ART

Granulated traditional basic mineral enriching agents are generally spread on agricultural soils and then incorporated by working the soil. Compared to powder they have substantial advantages for the client: ease of spreading, lower sensitivity to wind, very substantial reduction of the dust released. For the supplier, spreading of sales and deliveries also has a substantial advantage.

However, the granulation method reduces the agronomic efficacy of these enriching agents. Firstly, due to a lesser coverage of the soil by fine particles (far fewer impact points per square metre), and secondly due to the granulation method (by compacting, for example) and/or additives added in the course of the granulation. The latter improve resistance to impacts in the spreaders, improve ground distribution of the granules through a centrifugal effect, and limit dust releases during handling or spreading, but greatly impair the dispersal of the elementary particles which constitute them, which reduces the efficacy of granulated enriching agents.

Enriching agent granules are well known in the prior art, but their action on the ground (in addition to other disadvantages relating to manufacture, transport, handling, dust, etc.) is that of a "breakdown under the effect of gravity", i.e. the granule disintegrates when exposed to moisture, but crumbles into itself, covering only a diameter of 2-3 mm.

Since calcium carbonate is very insoluble in water it migrates very little in the soil. The soil must therefore be worked to disperse this type of granule satisfactorily, which is a major constraint for the end user, particularly in crop systems where working the soil is necessarily reduced or impossible (natural meadows, vineyards, forests, golf courses, etc.).

Certain granules contain soluble salts, notably of nitrogen in "nitric" form. They are very soluble and dissolve very quickly, and enrich the soil by capillary diffusion, without there being any requirement to cover a large ground area.

Conversely, very insoluble enriching agents are also known, which clearly have an effect only at the point of impact, and cover only an area which is of the order of the size of the granule, for example of the order of one mm.

Although these problems are well known, and have been so for a long time, in a surprising manner, industry and the users concerned have contented themselves with the current products and, to the knowledge of the Applicant, no products exist which seek to remedy these disadvantages in "professional" use.

Technical Problem

The present invention must therefore retain the known advantages of the granules, but must also minimise their disadvantages, giving them greater ground coverage capacity, without however being sensitive to moisture before spreading, whilst resisting the impacts of the manufacturing method, loading into sacks or as bulk, transport and final spreading on the soil. Naturally, it is also imperative to reduce dust release as far as possible and, naturally, to preserve the "nutritious" or "soil improvement" properties of the fertiliser or of the basic mineral enriching agent.

In addition, the invention also seeks to make such enriching agents effective even when working the soil is impossible or difficult, in natural meadows, or in vineyards, for example.

The granule must also be both sufficiently mechanically resistant to resist its manufacture and transport, as has been seen above, and be nonetheless capable of "melting" on the ground with very great ground coverage, meaning that there is no, or little, need to work the soil (except in certain types of agriculture where, for other reasons, working the soil is in any event necessary).

In what follows, the single term "enriching agent" will be used to designate basic mineral enriching, agents, notably with a carbonate base, and most specifically PCC (precipitated calcium carbonate) and/or GCC (natural ground calcium carbonate), but those skilled in the art will understand that the chosen solution also applies, making my necessary adjustments, to nitrogenous, phosphate, potassium or other fertilisers, used alone or in a blend with enriching agents, and, more broadly, to fertilising materials. For the sake of simplicity the word "enriching agent" will designate all these options.

It will be noted that the main aim of the invention is to make the granule more "effective", meaning that there is no, or little, need to work the soil. The invention does not seek to reduce the doses, but to make the dose applied more effective. The end user will probably continue to use the "habitual" doses, but the invention will enable them not to increase the necessary doses due to efficacy being reduced through lack of dispersal; they will then clearly observe all the improvements relating to liming or soil fertilisation, including improved yield due to better action against the soils natural acidification.

TECHNICAL SOLUTION

The general means chosen by the invention is that of "dynamic" disintegration of the granules.

The term "dynamic disintegration" refers to any form of force able to generate micro-granules over a large ground area around the granule deposited on the ground (broad "coverage" of the ground) by bursting, great fragmentation, great "dispersal", implying an internal force tending to cause the granule to burst or "explode" when it is in contact with the ground, and more specifically the ground water and/or moisture. Hereinafter, for the sake of simplification, "great fragmentation".

The adjective "great" in this case means an order of magnitude which is very markedly superior, as will be seen in the examples, to the closest known dispersals.

It will be seen below that the invention refers to ground coverage which may be as high as 2 to 5 cm in diameter, compared to 0.3 to 0.7 cm of the granules of the prior art.

The sole comparative reference will in this case naturally be the granules of the prior art, with the understanding that very satisfactory coverage can be obtained, in particular with powders, but with major disadvantages: dust, sensitivity to wind, etc.

According to invention, a general means property is used, the function of which is to cause dynamic disintegration of the "enriching agent" granule which will, in contact with ground water and/or moisture, cause bursting or dispersal or "explosion" of the elementary particles (i.e. of the particles which comprise each individual granule). By this means, the product/ground/water contact areas are greatly increased, and therefore the size or area or volume of the granule's zone of influence are greatly increased, thus favouring the neutralisation reactions which are expected from the basic mineral enriching agents or the feeding of the plant by the nutrients contained in the granulated fertilisers.

The invention therefore relates to a notably basic mineral enriching agent containing as a base a mineral carbonate characterised in that it contains at least one "dynamic disintegration" agent, capable of causing in the presence of water and/or moisture, in the granule and/or at its surface, bursting, a great fragmentation, a dispersal, or a great "dispersal", i.e. implying a force within and/or on the surface of the granule, tending to cause the granule to burst or "explode" when the said granule is in contact with water and/or moisture, and notably with the ground, and more specifically the ground water or moisture.

The "dynamic disintegration" will be used for all such phenomena, unless otherwise stated.

The invention notably relates to such a mineral enriching agent, characterised in that the said carbonate is natural or precipitated calcium carbonate.

DESCRIPTION OF THE INVENTION

In what follows, several types of embodiment of the invention will be described, supporting the said "general means" through the same function of "great fragmentation of the individual granule", a function implemented by means of an internal force, generated in contact with free water or moisture of the air (this exposure to ambient moisture will be avoided as far as possible, during manufacture, storage and transport, for obvious reasons, but also during spreading, in order that the dynamic disintegration occurs on the ground or as close as possible to it, so as to cause a maximum effect) and/or, in a greatly preferred manner, of the ground, inside and possibly on the surface of the granule, but essentially inside the granule, due to the reaction of at least one of the components of the granule with the water of the ground (or its moisture), in an extremely preferred manner, with the water entering the granule, which can bring its action to bear in a better manner within the structure of the granule.

The Applicant, in accordance with the "general function" described above, considered "doping" the basic mineral enriching agent, notably a limestone enriching agent, by quicklime (CaO).

However, this leads to a very marked failure, since although quicklime can, certainly, swell in contact with ground water, and cause the granule to explode, before this happens, since it is a product which is extremely reactive and hygroscopic, it will also react in contact just with moisture in the air, and swell. The granules will therefore burst, for example during transport or storage, which is the reverse of the determined goal.

Through this example, it can be seen that the same water which could cause dynamic disintegration also acts against stability of the granule's properties over time.

This logical solution has already been tried, and clearly rejected, something which has created a prejudice against this type of technology by "swelling"; indeed, it is not possible either to eliminate ambient moisture, or to transport the granules in vacuum-packed bags or in nitrogen, or to use other eminently impossible solutions.

Industry has therefore abandoned this approach once and for all, and the Applicant's merit is nonetheless to have continued to explore this approach.

In fact, the Applicant then turned to the approach of very great fragmentation, as defined above, but seeking to use not a reactive base such as lime, but at least one acidic additive. The latter, reacting with the carbonate of the enriching agent, would lead to intense production of bubbles outside and preferably within the granule, thus causing it to burst.

It might have been supposed that an acidic additive reacting with the basic limestone enriching agent would reduce its efficacy; with low doses (of the order of 0.5-2%, preferably around 1%, by dry weight) which the Applicant developed this effect is quantitatively negligible.

To maximise the explosion reaction it would have been, logical to use strong acids, but these are dangerous to handle, and, after testing, react too violently, and are also, due to their high reactivity, difficult to incorporate during the manufacturing "process".

It might have been thought to use micro-encapsulated strong acids, for example encapsulated by a polymer, etc., but such solutions are clearly incompatible with another imperative of the invention, which is that of economic acceptability. Indeed, the technical solutions found must not lead to an excessively significant increase of the prices of the granules.

The Applicant considered using phosphoric acid, but phosphorus is already marketed through other channels, and in this case it would be in quantities which would be too small to be exploitable in agriculture. The difficulty of incorporating this type of product in an industrial "process" and its corrosive action led the Applicant not to take this approach, it is therefore one possible solution, but one which is markedly less preferred, since its effects are less predictable, due to the competition described above.

The Applicant therefore tried other acids, ones which were both "weak", in order that they not be too reactive, and which did not come into competition with the components of an enriching agent or fertiliser of the type considered here.

The Applicant tried known acids and acids which were easily obtainable in the market, such as formic and citric acid, but the gaseous release formed proved to be insufficient to cause, in the field, genuine dispersal of the elementary particles of the granule; fragmentations covering an area of approximately 8-10 mm were indeed achieved in the laboratory, and therefore better than dispersal under the sole effect of gravity, but this did not satisfy the ambition of very great fragmentation which the Applicant had determined as their goal.

Molasses (sugar in suspension derived from beetroot crops), used at a dose of 2-3% by dry weight, are used as an additive during ganulation, and do indeed satisfy the requirements of granulation, but the granule obtained breaks down solely under the effect of gravity, without any dynamic or active character.

Continuing with another approach, the Applicant tested manufactured granules in the laboratory and in the field, incorporating into them acrylic polymers known as "anionic super-absorbent" acrylic polymers, made from cross-linked copolymers of potassium acrylamide and acrylate of different ganulometries (300 µm to 3 mm), at different doses ranging from 0.1% to 2%. The disintegration tests undertaken gave interesting dynamic disintegration results (see the results of the field tests). However, the cost of this technology, and the intrinsic nature of the polymers used led the Applicant to consider a less expensive and more natural alternative technology, i.e. one not making use of synthetic chemistry.

Ultimately, after all these tests, the solution adopted by the Applicant is to use, in a completely preferred manner, and with surprising results, a totally different approach, i.e. a moderately swelling product, of the swelling clay type, and notably of the bentonite type (a well known swelling clay, which there is no need to describe). This clay is used as a binder, or as a secondary retention agent in certain systems, known as dual systems, for the manufacture of paper or card sheets, or as a weighting agent in boring sludges and similar substances.

Its water-swelling properties, which are however well known, have never been used to accomplish "dynamic" fragmentation according to the invention. In a quite surprising manner, the use of bentonite for this specific application revealed bursting potential, i.e. potential for very active cooperation, mostly with the said "dynamic disintegration", greatly superior to that which its simple swelling might have led one to imagine, in terms of the bursting during laboratory testing, but also and above all in field tests: after considering the surprising results, and without wishing to be bound by a theory, the Applicant suggests that a synergy is formed by the natural swelling force and the physical compression force exerted by the carbonate during factory compaction.

This "power" of unforeseeable magnitude is surprising and plays a large part in the invention.

A conventional granulation method was used, i.e. addition and incorporation of molasses, followed by dry blending, of the enriching agent and of the bentonite, high-speed stirring, followed by passing between two compacting rollers to form a continuous plate, a sort of "carpet" approximately 2 to 3 mm thick, which is then broken up to form polygonal granules which will then be eroded and screened before constituting the more or less regular definitive granule with a diameter of approximately 2 to 5 mm.

The term "more or less regular polygonal granules" is taken to mean a granule the volume of which, considered from any angle, is visible in the form of a regular polygon, i.e. a polygon the sides (or fines) of which are not completely flat, i.e. which may be damaged, broken or chipped, by the manufacturing, and/or packaging, anchor transport, and/or spreading steps.

A first series of manufacturing tests with bentonite of IMPERSOL™ brand at different doses, from 5 to 1% by mass, was undertaken on batches of 10 kg initially as a pilot manufacturing run. These tests enabled the manufacturing method to be validated (no dust, possibility of compacting, no soiling of the equipment, satisfactory robustness and satisfactory moisture resistance during storage, transport, handling and spreading).

The 2% dose represented an excellent technical-economic compromise, with satisfactory laboratory dynamic disintegration results. A field test undertaken (cf. end of text), on a silty soil after simulated rain (15 mm spraying) revealed excellent dynamic disintegration and fragmentation properties, since it led to areas of cover of the order of 3.5 cm in diameter.

Other manufacturing tests with batches of 10 tons, with a true industrial manufacturing run, were then conducted. The granules obtained also had very favourable field burst ranges, generally of the order of 2 to 4 cm or more, for doses ranging from 1.5 to 3% by weight, with a dispersal of results between 2 and 3 cm in diameter for doses close to 2% by weight.

The IMPERSOL™ data sheet designates this product as a clay belonging to the family of smectites. Its appearance is that of a light powder of 14% maximum water content, with 30% maximum overtail with a 75-micron sieve (dry testing), and of specific weight of 2.3 $g/cm^3$.

Other Clays which Array May be Used

Other clays may be used, provided they have swelling properties by constitution, and they cause the granule to burst. Indeed, the tests undertaken by the Applicant with other clays do not systematically enable the hoped-for effects to be obtained.

Other Minerals which May be Used

Tests have been undertaken with different materials as supports: calcium carbonate of natural origin from different quarries, dolomites and blends of dolomites with calcium carbonate.

It will be possible to use the said natural or precipitated carbonates (PCC) in blends with one another, and to use other minerals such as natural or precipitated calcium carbonates (PCC) replacing, in whole or in part, the said carbonate(s) by minerals such as dolomites, natural phosphates blended with the enriching agent (to take advantage of the P205 provided for the plants, and not for its acidic effect), ammonia nitrogenous fertilisers or other fertilisers. These materials are very well known to those skilled in the art, and will not therefore be described in detail here.

Nitric nitrogenous fertilisers and potassium salts are not concerned, since they are naturally very soluble.

The present invention will be better understood on reading the following examples, given on a non-restrictive basis.

A Examples of Compacting:

The Applicant has undertaken compacting tests using different components intended to confer the dynamic disintegration properties.

For these compacting tests the following criteria were adopted to assess the utility and results of each product tested, with products selected according to different criteria:
Properties of the chips.
Quality of hot disintegration.
Cold testing in water and on moist cotton.
Cost of the products.

B Examples and Results of Doses:

Impersol™ bentonite was tested at 5%, 2%, 1% and 0.5% by weight of the powdered material used as a support.

For other products the range actually explored was wider with the lower rates: 0.01%. The upper limit was dictated by the correlative reduction of the fertilising elements or neutralising value contents in the granule, and the increase of the cost price.

Incorporation rates of the order of 10% are possible and were considered, but they are unnecessarily costly given the resulting improvement of the properties.

The doses were then gradually reduced.

The lower limit, 0.5%, corresponds to an improvement which is almost no longer perceptible compared to the untreated control, and which therefore constitutes the lower limit (1% being more realistic).

The above examples define an effective range (including taking account of the additional cost for the end user), and a preferred value is around 2%.

C Bentonite Results

The granules to which Impersol™ bentonite, as described above, was added were used, at different doses.

For each dose, and also for a method without additive (control), 16 granules were positioned on an agricultural soil on a grid measuring 5 cm×5 cm. A chip portion derived from the compacting rollers was also placed in the middle of the grid (the chip is then broken to produce the granules). An analysis of this chip portion is interesting although, naturally, granules are used in the field.

Using a knapsack sprayer of Berthoud™ brand, fitted with nozzles with slits, 15 mm of rain was applied to this device.

The quantity of simulated rain was controlled by a rain gauge.

Photographs were taken before and above all after the rain simulation, for each of the tested doses, and the control.

Figure 1:
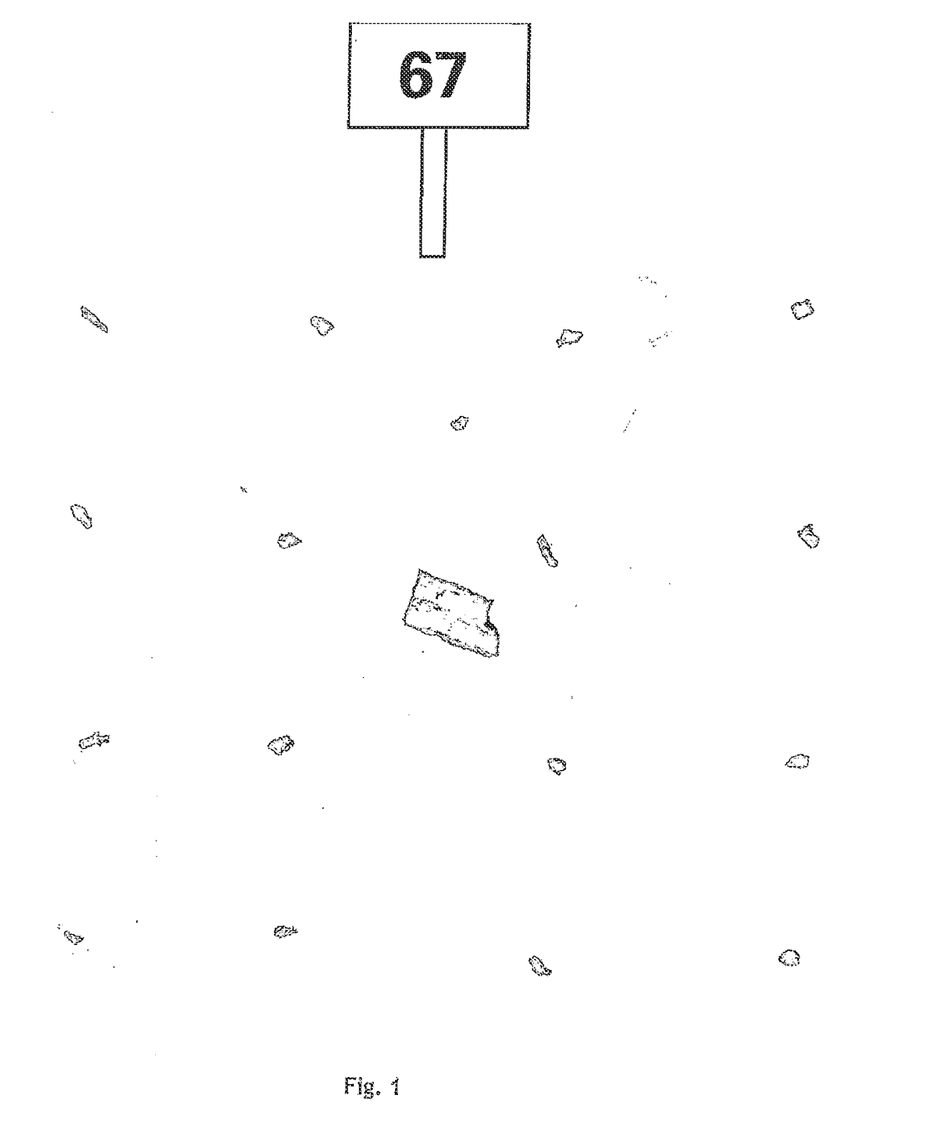
FIG. 1 represents a rain simulation with control granules, i.e., without bentonite.

FIG. 1 (zone 67) represents a control granules test, i.e. without bentonite. The granules and the chip portion are intact, or almost intact, even after 15 mm of rain.

Figure 2:
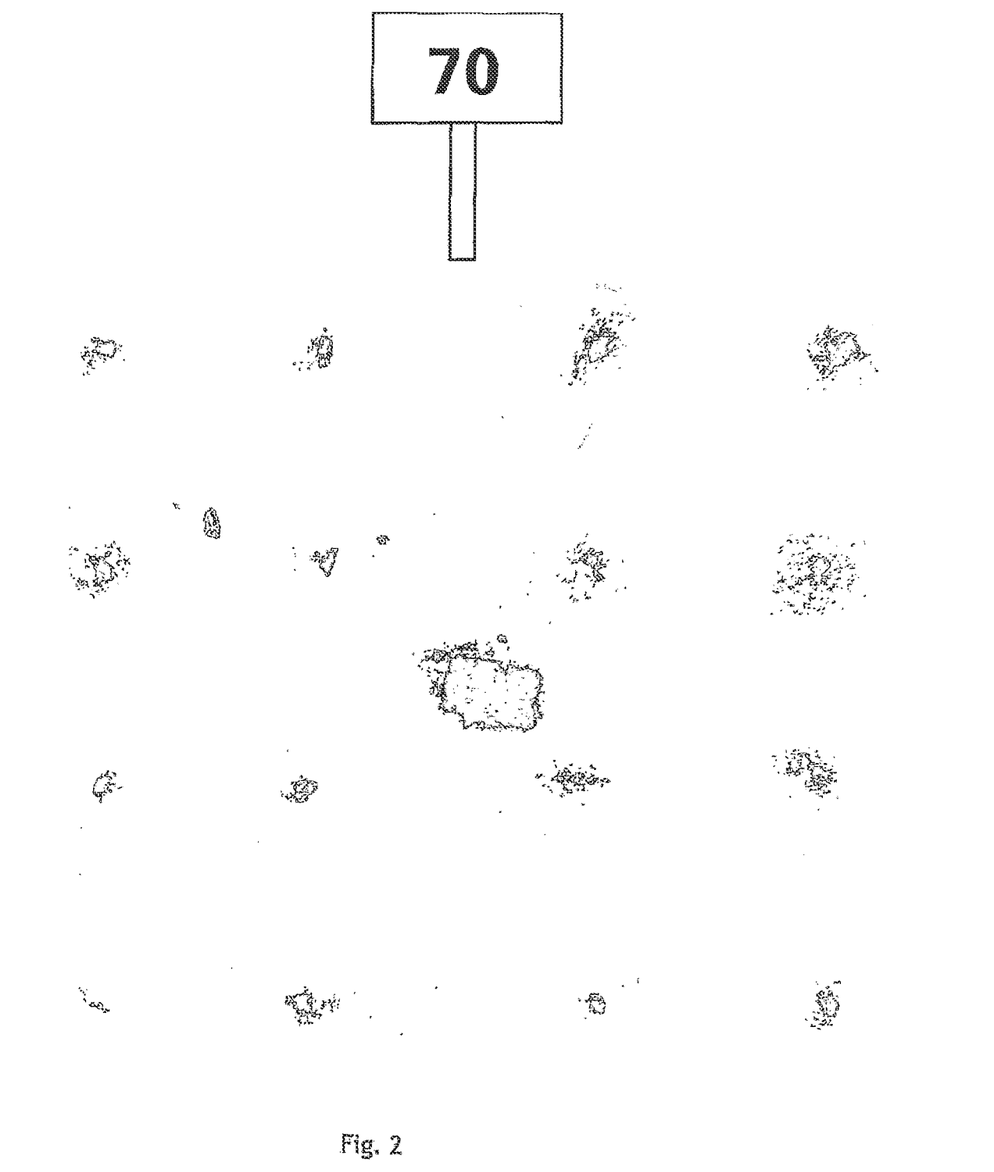
FIG. 2 represents a rain simulation with granules containing 1% of bentonite.

FIG. 2 (zone 70) represents granules containing 1% of bentonite. Visible traces of dynamic disintegration according to the invention are seen with, already, satisfactory coverage of the zone.

Figure 3:
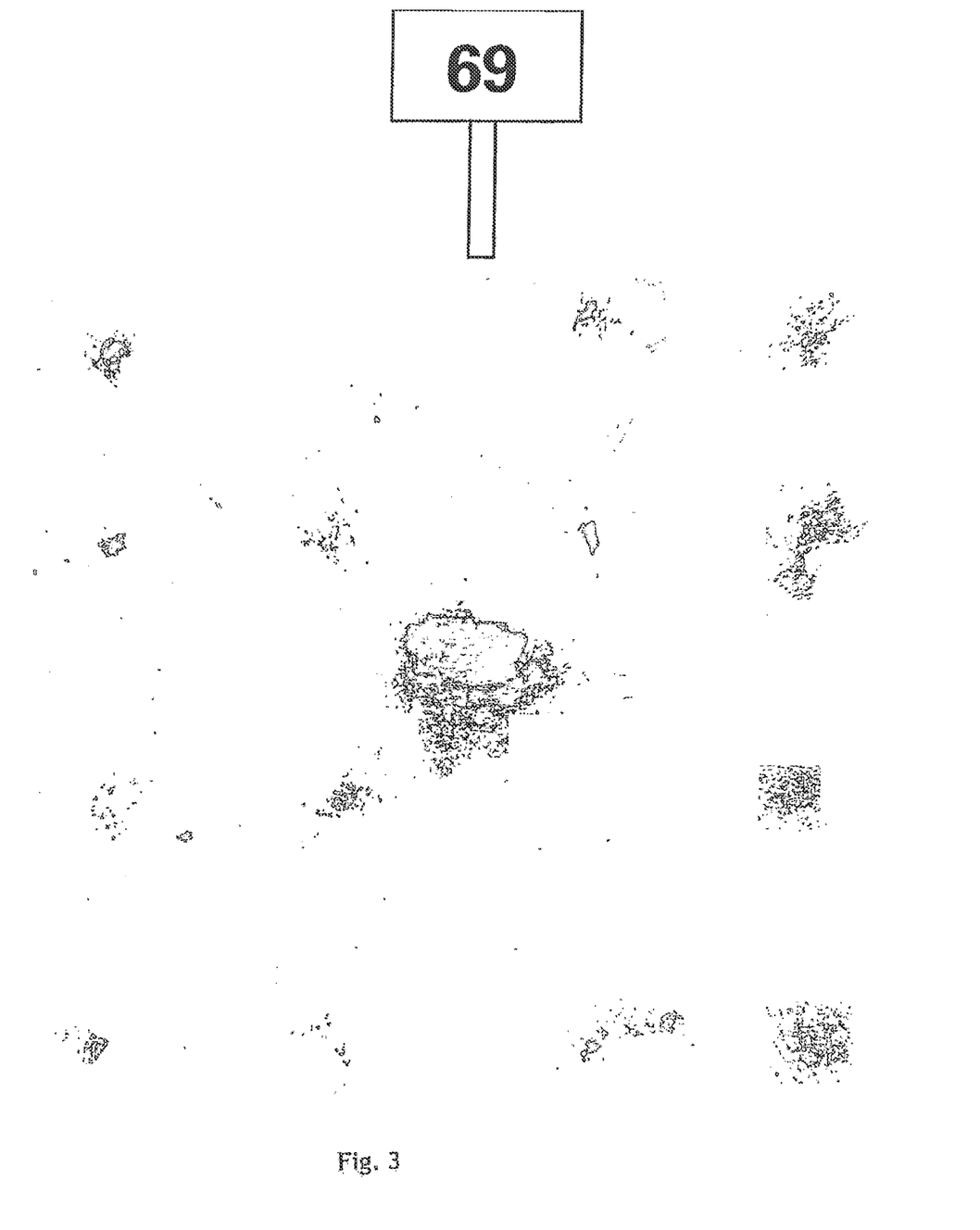
FIG. 3 represents a rain simulation with a 2% dose of bentonite.

FIG. 3 (zone 69) represents a 2% dose of bentonite. Disintegration superior to that of FIG. 2 is noted, with a few granules being passed in powder form covering an already large zone. The dynamic integration which occurred with the chip portion can also be observed.

Figure 4:
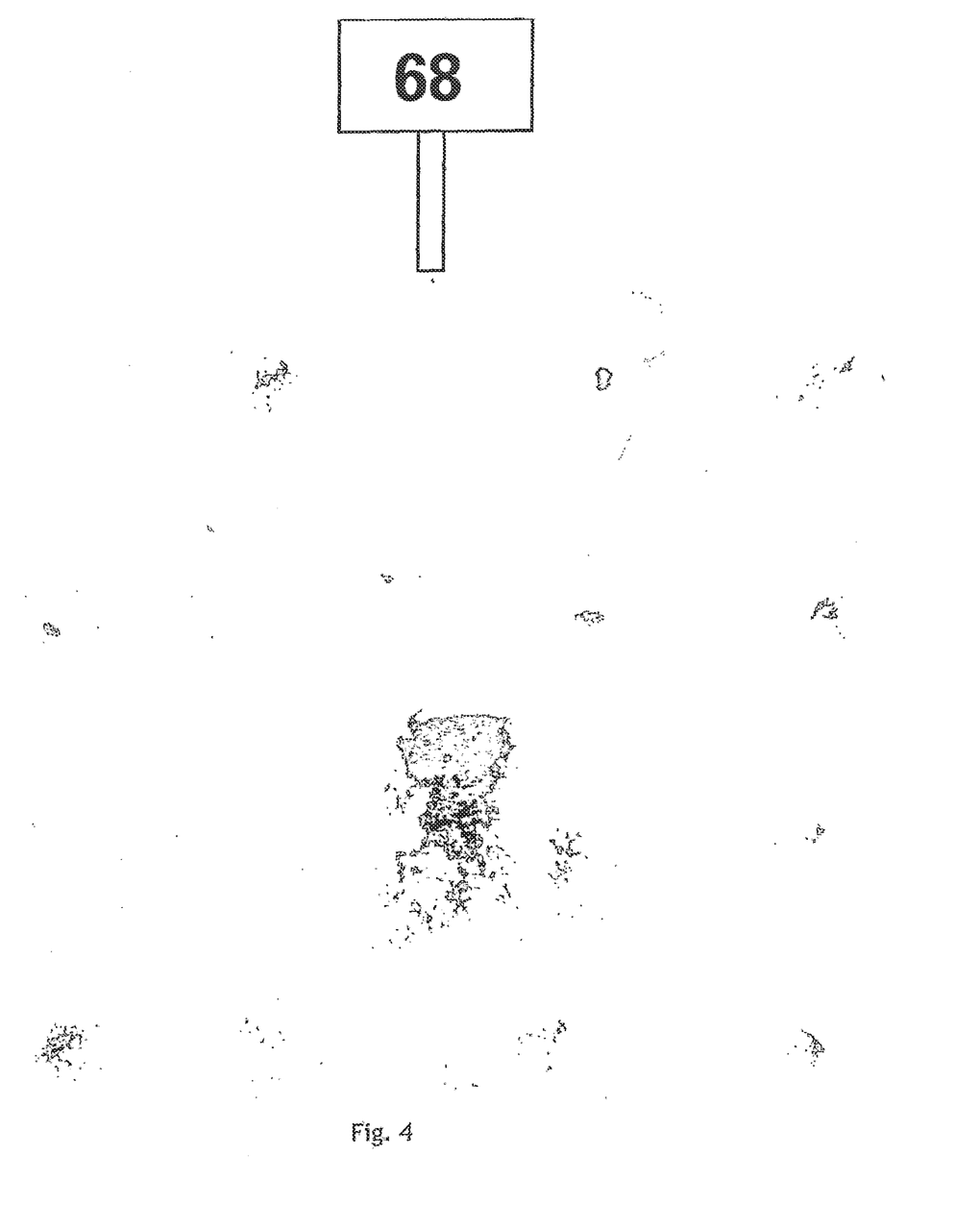
FIG. 4 represents a rain simulation with a 5% dose of bentonite.

FIG. 4 (zone 68) represents a 5% dose of bentonite. It is noted that only one granule remains (at the bottom left), which seems to have been less affected than the others, however with white traces covering a broad zone around it.

The comparative plane projections of the documents, photographs and graphics shows very satisfactory consistency.

Procedure for Assessing the Covered Area:

1) Concerning the Ground Colonisation Area Measurements
Available photographs were printed life-size.
Visually, using plane projection comparisons, the differences are clear.

To be more precise and factual, the limits of ground colonisation of each of the 16 granules were framed between two vertical lines, for each method tested:
Control granule not treated be hare rain
Control granule not treated after 15 mm of rain
Granule treated with 1% of Impersol™ after 15 mm of rain
Granule treated with 2% of Impersol™ after 15 mm of rain
Granule treated with 5% of Impersol™ after 15 mm of rain
The space between the two lines was measured.

The 16 diameters were then summed, giving a reasonably representative value of the ground area colonisation, and one that is reproducible in all cases.

These values fully confirm the visual impression.

These values were used as performance indicators.

Starting with the unidimensional "sum of the diameters of the 16 granules" variable, this value was squared to reach a concept of two-dimensional area, closer to the sought effect (notion of area coverage).

The values obtained were compared between the different methods.

It can be seen that the "Control granule not treated before rain" and "Control granule not treated after 15 mm of rain" are identical. All other things being equal, the dynamic disintegration results can therefore be ascribed solely to the influence of the additives used.

Concerning the Graphs Obtained

Figure 5:
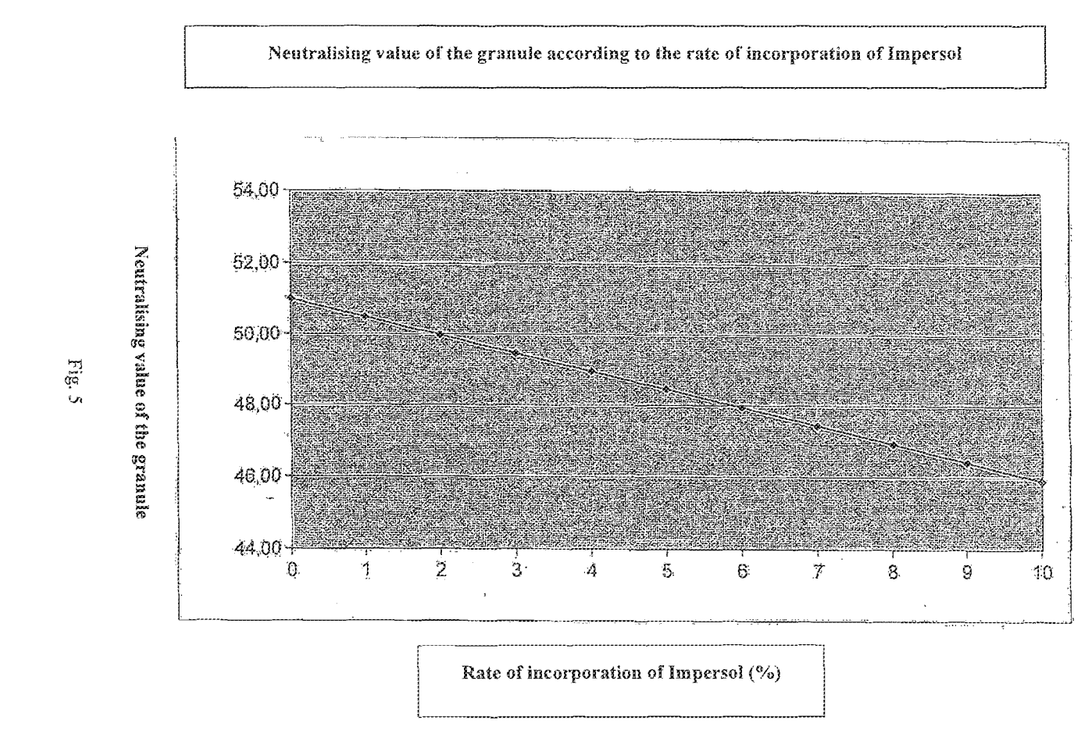
FIG. 5 illustrates a plot showing the neutralizing value of the granule versus the rate of incorporation of Impersol.
Figure 6:
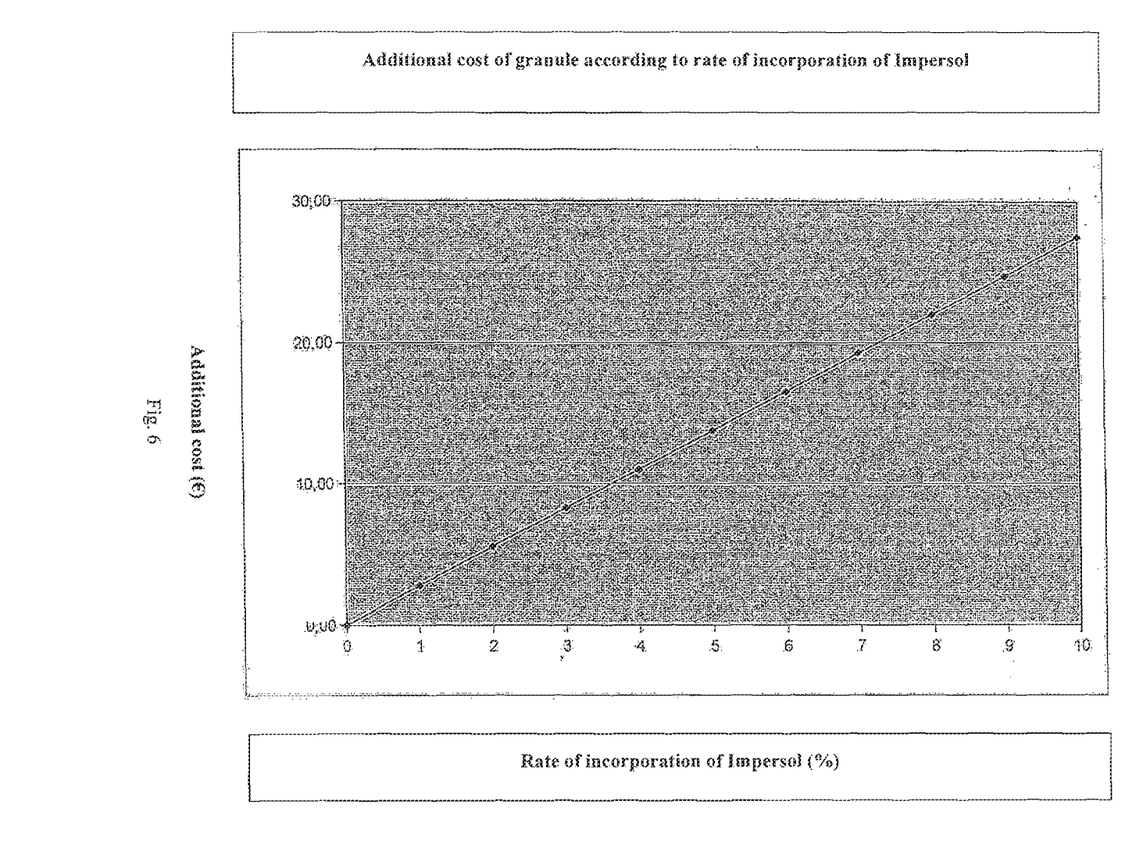
FIG. 6 illustrates a plot showing the additional cost versus the rate of incorporation of Impersol.

Several graphs were plotted on the above bases, according to the rate of incorporation of the Impersol™:
Neutralising value (FIG. 5)
Additional costs (FIG. 6)
Sum of the diameters of the 16 granules (FIG. 7)
Area covered (above value squared) (FIG. 8)

The areas covered are thus multiplied by a factor ranging from 1 to nearly 10, according to the tested methods.

By placing the curves on top of one another it is clear that for the optimum range it is necessary to achieve a compromise between:
the improvement of area covered,
the increased cost,
the reduction of the neutralising value.

These curves will help those skilled in the art to adapt the dosage values and ranges described above to the particular use which they will envisage, 2) Concerning the Choke of the Range of Rate of Incorporation In light of the curves we place this compromise around 2%, and preferentially between 1 and 3%, since it is around 2% that the inflection point of the curve of increase of the areas is found (the point above which the cost increases more rapidly, and the neutralising value declines faster than the area covered increases).

It clearly appears that an incorporation rate of over 5% will not have much effect, since the gradient of the "area" curve then becomes very shallow.

The appearance of a plateau of the asymptotic type above 5% is noted.

The appended curves therefore fully justify the dosing and dose range values described above.

It is, furthermore, surprising to note that a "plateau" appears from approximately 4-6%, notably 5-6%, according to the "sum of the diameters of 16 granules f (% incorporation)" curve.

Figure 7:
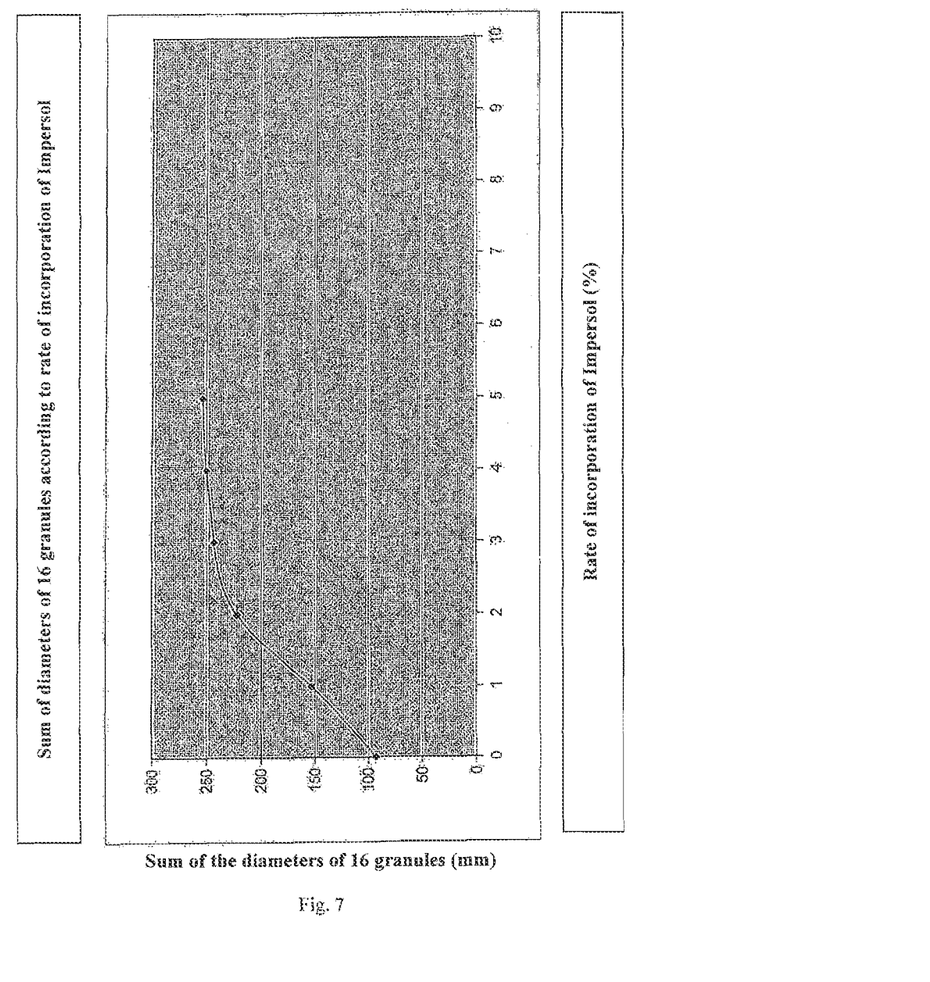
FIG. 7 illustrates a plot showing the sum of the diameters of 16 mm granules versus the rate of incorporation of Impersol.
Figure 8:
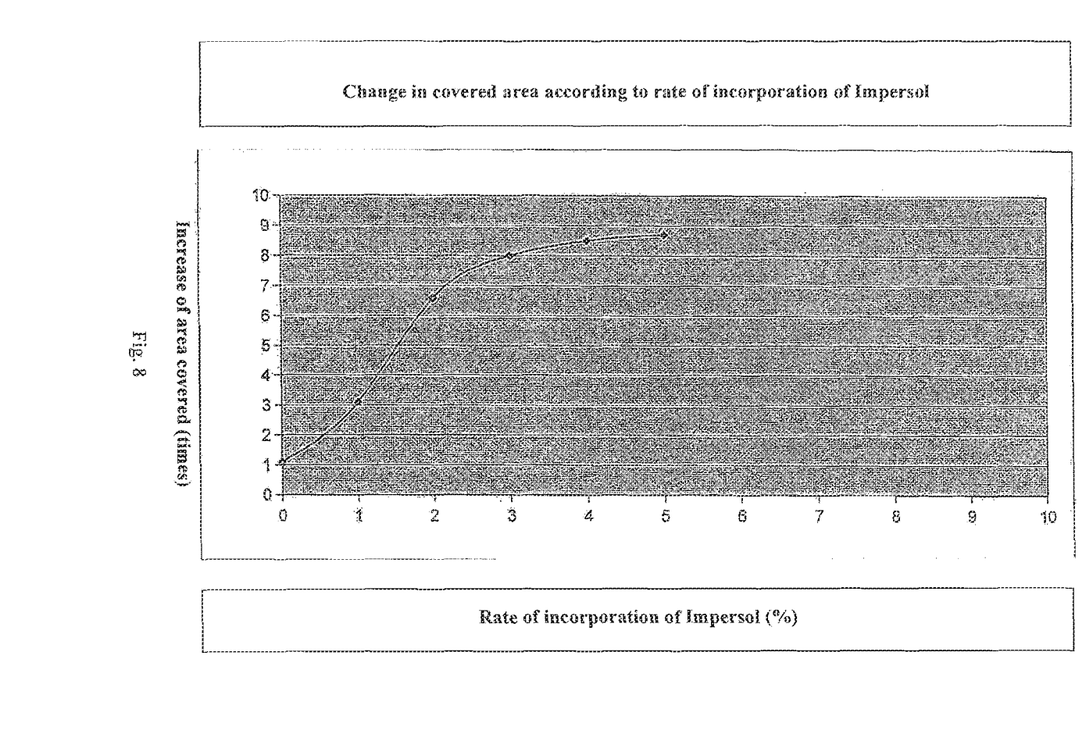
FIG. 8 illustrates a plot showing the increase of area covered in time versus the rate of incorporation of Impersol.

This plateau is also found in FIG. 7, "Changes of the sum of the diameter of the 16 granules".

Concerning the redaction of the rate of fines to be recycled during the method of manufacture (since the granules treated with Impersol™ seem, when they leave the compactor, to produce less dust (rate of particles of diameter of less than 1 mm)), this reduction of the rate of dust production is a substantial advantage in the industry in question.

The lower limit of the range is around 0.5-0.7 (a very average result, but of low cost), and the upper limit is around 5-6% since, above this limit, two deleterious effects are noticed, namely the neutralising value or the fertilising elements content of the enriching agent is reduced when the clay content is increased, and in addition the cost becomes too high for an additional disintegration effect not justifying this additional cost.

An effective and reasonably inexpensive range, and one which does not cause too much neutralising value or content to be "lost", will therefore be between 2 and 4%, preferably 2-3%, and an optimum value appears to be around 2%, i.e. 1.8 to 2.3%, if reference is made to the appended figures.

Those skilled in the art will understand that the lower limit is dictated by the appearance of an identifiable dynamic disintegration effect, whereas the upper limit is, instead, dictated by the fact that the additional dynamic disintegration is not substantial enough to justify the additional cost.

Those skilled in the art will also understand that these ranges can vary from one clay to another, without however departing greatly from the above values and, consequently, they may adjust the dosage according to the swelling clay used, by a few simple routine tests, and comparison with the examples presented here. Lastly, those skilled in the art will be able to extrapolate the above values to other swelling clays, since the manufacturer gives the swelling percentage on their data sheets: it is therefore easy to make reference to the Impersol™ product, the data sheet of which, Edition 02 of 23 Aug. 2002, gives a swelling of 11 ml/g minimum (CTIF test, recommendation 403).

Detailed Protocol of the Field Disintegration Tests to Characterise the Invention.

Goal:

The aim of this test is to observe the changes of the granules, whether or not treated, on a re-moisturised agricultural soil, on which will be applied, using a sprayer, the equivalent of 15 mm of rain.

Plan of the Experiment:

$1^{st}$ Step:

Reconstitution from the soil of a neighbouring field of an artificial plot measuring approximately 1 m×1.30 m with satisfactory visibility, to facilitate the photographs without being hindered by the presence of vegetation.

Initial artificial re-moisturisation, to return to a state of moisture comparable with that of the original plot, since the sampled soil has become very dry.

The initial state is air dried, without free water, to the field capacity.

Separation into 12 boxes measuring approximately 30 cm×30 cm

Deposit of 16 granules in a chessboard fashion on a grid with 6 cm intervals measuring approximately 24 cm×24 cm for each box, and addition of a fragment of manufacturing chip in the centre.

The three products judged most effective during the previous tests are tested and photographed with a control and three incorporation doses, which are different for the different products.

Super-absorbent cross-linked copolymer of potassium acrylamide and acrylate such as, preferably, but on a non-restrictive basis, the product AQUASORB™ KC.

Moderately swelling clay of the type described above such as, preferably, but on a non-restrictive basis, the product IMPERSOL™.

Citric acid; As mentioned above, citric acid is a weak acid which may be used in the invention, but in a markedly less preferred way than swelling or moderately swelling clay, or the super-absorbent cross-linked copolymer. This product is used here to better identify the "reasonable" limits of the present invention.

To make a visual comparison more evident, the untreated controls are on the top line, followed by the high-dose treatments just below (maximum contrast), followed by the medium dose, and lastly the low dose at the bottom.

Each elementary box is given a number from 63 to 74, firstly from top to bottom, and then from left to right for the following columns.

Sample A: Aquasorb KC
With control: Control without Aquasorb KC™ (n° 63)
A 0.1%: Contains 0.1% d'Aquasorb KC™ (n° 66)
A 0.15%; Contains 0.15% d'Aquasorb (n° 65)
A 0.2%: Contains 0.2% d'Aquasorb KC™ (n° 64)
Sample B: Impersol™
B control: Control without Impersol™ (67)
B 1%; Contains 1% of Impersol™ (70)
B 2%: Contains 2% of Impersol™ (69)
B 5%: Contains 5% of Impersol™ (68)
Sample C: Citric acid in powder form
C control: Control without citric acid (71)
C 0.5%: Contains 0.5% of citric acid (74)
C 1%; Contains 1% of citric acid (73)
C 2%: Contains 2% of citric acid (72)

Photographs taken for each box, such that their changes may be able to be compared.

$2^{nd}$ Step:

Photographs taken at the following steps:
T1 with 0 mm of artificial precipitations
T2 with 5 mm of artificial precipitations
T3 with 15 mm of artificial precipitations Analysis of Results:

Differences clearly appear:
between the control samples and the samples with additives, between the doses for a given additive, between the different additives.

Comparison of three percentages of Aquasorb™ (+control) at 15 mm.

Very satisfactory disintegration with Aquasorb™, markedly better at 0.2% than at 0.1% and 0.15%.

Comparison of the three percentages of swelling clays (+control) at 15 mm:

Excellent Disintegration.

Comparison of three percentages of citric acid (4 control) at 15 mm:

Effects compared to the control, but much less impressive than the other additives. Citric acid is therefore the least effective of the three products tested.

The conclusions are those which have previously been given above.

Those skilled in the art will understand that the enriching agent is technically adapted on a case-by-case basis to form ground covers which may reach 2 to 5 cm in diameter for a granule of standard size, 2 to 5 mm thick, where the said granule takes the form of a more or less regular polygon, and they will be able to make these technical adjustments without difficulty on reading the above description and examples.

The invention claimed is:

1. A compacted granule for agriculture application consisting of a mineral enriching agent, 0.5 to 7% by dry weight mass of a disintegration agent, molasses, and optionally a fertilizer, wherein the mineral enriching agent comprises calcium carbonate, and the disintegration agent is a swelling bentonite, wherein the compacted granule has a diameter of 2 to 5 mm and a substantially polygon shape, wherein the compacted granule is prepared by dry blending the mineral enriching agent, the disintegration agent, the molasses, and optionally the fertilizer, to obtain a blended mixture, subjecting the blended mixture to roller compaction to obtain a compacted blended mixture in the form of a plate, breaking up the plate to form compacted granules, and screening the compacted granules to obtain a compacted granule having a diameter of 2 to 5 mm and a substantially polygon shape, and wherein the compacted granule bursts or explodes from an internal force within the granule upon exposure to water or moisture to obtain a ground coverage of 2 to 5 cm of the mineral enriching agent.

2. The compacted granule according to claim 1, wherein the mineral enriching agent is natural calcium carbonate.

3. The compacted granule according to claim 1, wherein the mineral enriching agent is precipitated calcium carbonate.

4. The compacted granule according to claim 1, wherein the mineral enriching agent comprises calcium carbonate and dolomite.

5. The compacted granule according to claim 1, wherein the bentonite has a maximum water content 14%, a 30% maximum overtail of 30%, a 75-micron sieve under dry testing, and a specific weight of 2.3 g/cm$^3$.

6. The compacted granule according to claim 1, including 1 to 7% by dry weight mass of bentonite.

7. The compacted granule according to claim 1, including 1 to 5% by dry weight mass of bentonite.

8. The compacted granule according to claim 1, including 1 to 3% by dry weight mass of bentonite.

9. The compacted granule according to claim 1, including 2% by dry weight mass of bentonite.

10. The compacted granule according to claim 1, including 0.6 to 6% by dry weight mass of the disintegration agent.

11. The compacted granule according to claim 1, further comprising a fertilizer.

12. The compacted granule according to claim 11, wherein the fertilizer is a natural phosphate, an ammonia nitrogenous fertilizer, or a blend thereof.

13. A fertilizer comprising the compacted granule according to claim 1.

* * * * *